United States Patent [19]
Hartman et al.

[11] Patent Number: 4,868,662
[45] Date of Patent: Sep. 19, 1989

[54] EXTERNAL-POWER STAGE

[75] Inventors: Uwe Hartman, Villingen-Schwenningen, Fed. Rep. of Germany; Michel van den Driesche, Meylan, France; Udo Mai, VS-Villingen, Fed. Rep. of Germany; Philippe Maige, Seyssinet-Pariset, France

[73] Assignee: Deutsche Thomson-Brandt GmbH, Villingen, Fed. Rep. of Germany

[21] Appl. No.: 244,706

[22] Filed: Sep. 15, 1988

[30] Foreign Application Priority Data

Sep. 19, 1987 [DE] Fed. Rep. of Germany ....... 3731645

[51] Int. Cl.$^4$ .................. H02M 3/04; H02M 3/24
[52] U.S. Cl. ......................... 358/190; 358/194.1; 315/411
[58] Field of Search ............... 358/190, 194.1; 315/411

[56] References Cited

U.S. PATENT DOCUMENTS 4,727,464 3/1988 Hartmann et al. ............. 3.5/411 X

Primary Examiner—James J. Groody
Assistant Examiner—Mark R. Powell
Attorney, Agent, or Firm—Max Fogiel

[57] ABSTRACT

An external-power stage suitable for use with television sets, for example. A transformer is provided with control circuits in both the primary side and the secondary side. Each of the control circuits have pulse-width modulators which provide pulses to an electronic switch. The control circuit on the primary side provides pulses to that switch of varying pulse width and of sufficient magnitude to maintain the television set in a standby mode. The control circuit in the secondary side of the transformer, on the other hand, comes into operation when the television set is turned on and provides pulses to the electronic switch while operating with the control circuit in the primary side for a predetermined period of time. Thereafter, the control circuit in the secondary side takes over the function of providing pulses to the electronic switch while the control circuit on the primary side is switched to an inoperative stage. The control circuit in the primary side is operative only in the standby mode, whereas the control circuit in the secondary side is operative during the normal mode of operation.

10 Claims, 2 Drawing Sheets

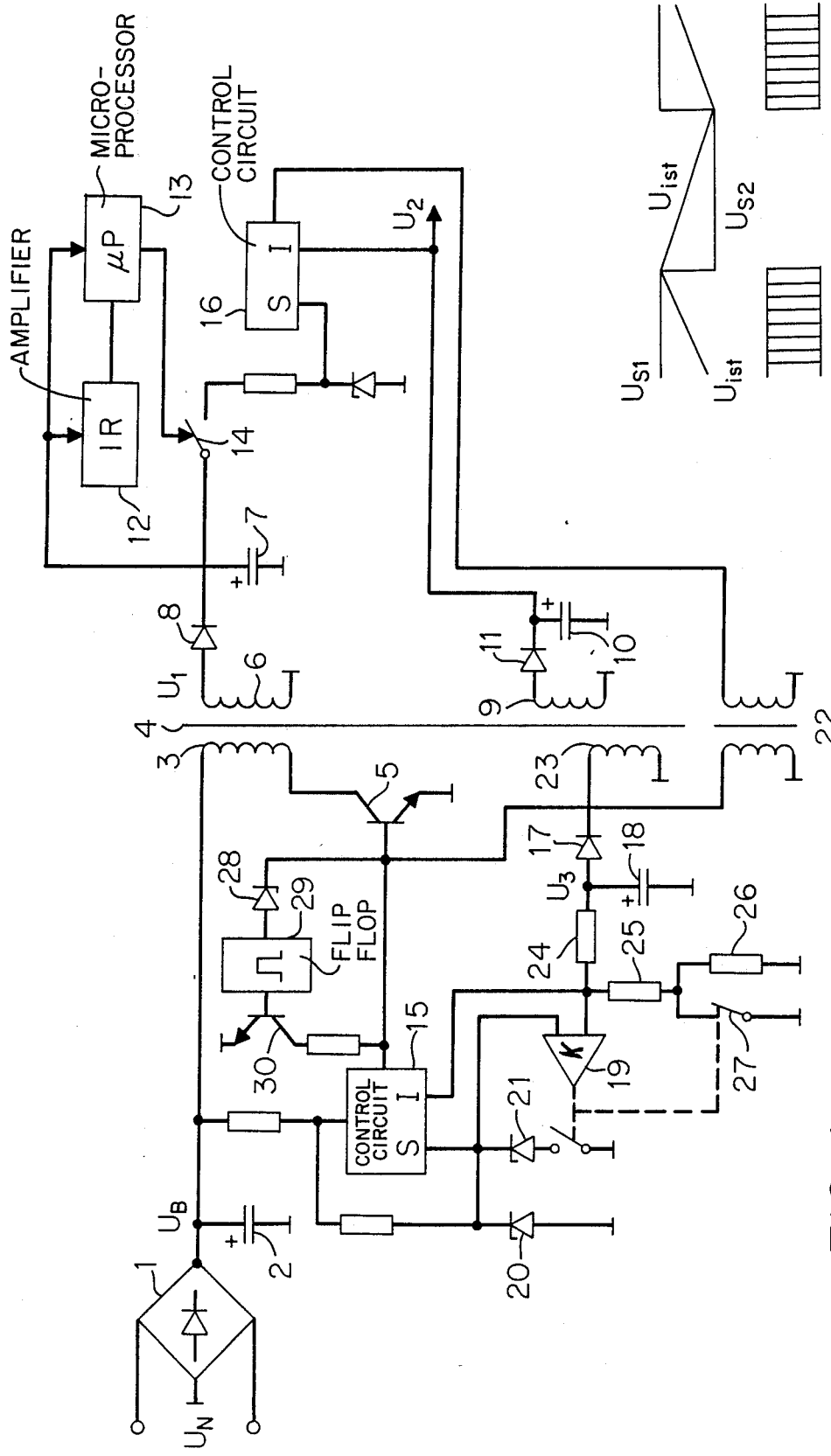

EXTERNAL-POWER STAGE

The invention concerns an external-power stage with a control circuit that varies the pulses controlling the switch in the external-power stage in accordance with load.

External-power stages are employed in television sets for example. The sets are delivered with a low stand-by mode to allow the receiver to receive ON signals from a remote control.

The object of the invention is to provide a very cost-effective stand-by mode. This object is attained by the invention recited in the major claim. Other advantageous embodiments of the invention will be evident from the subsidiary claims.

One embodiment of the invention will now be specified with reference to the drawing.

FIG. 1 is a block diagram of the invention and

FIGS. 2 and 3 are graphs that illustrate how the invention operates.

Figure 3:
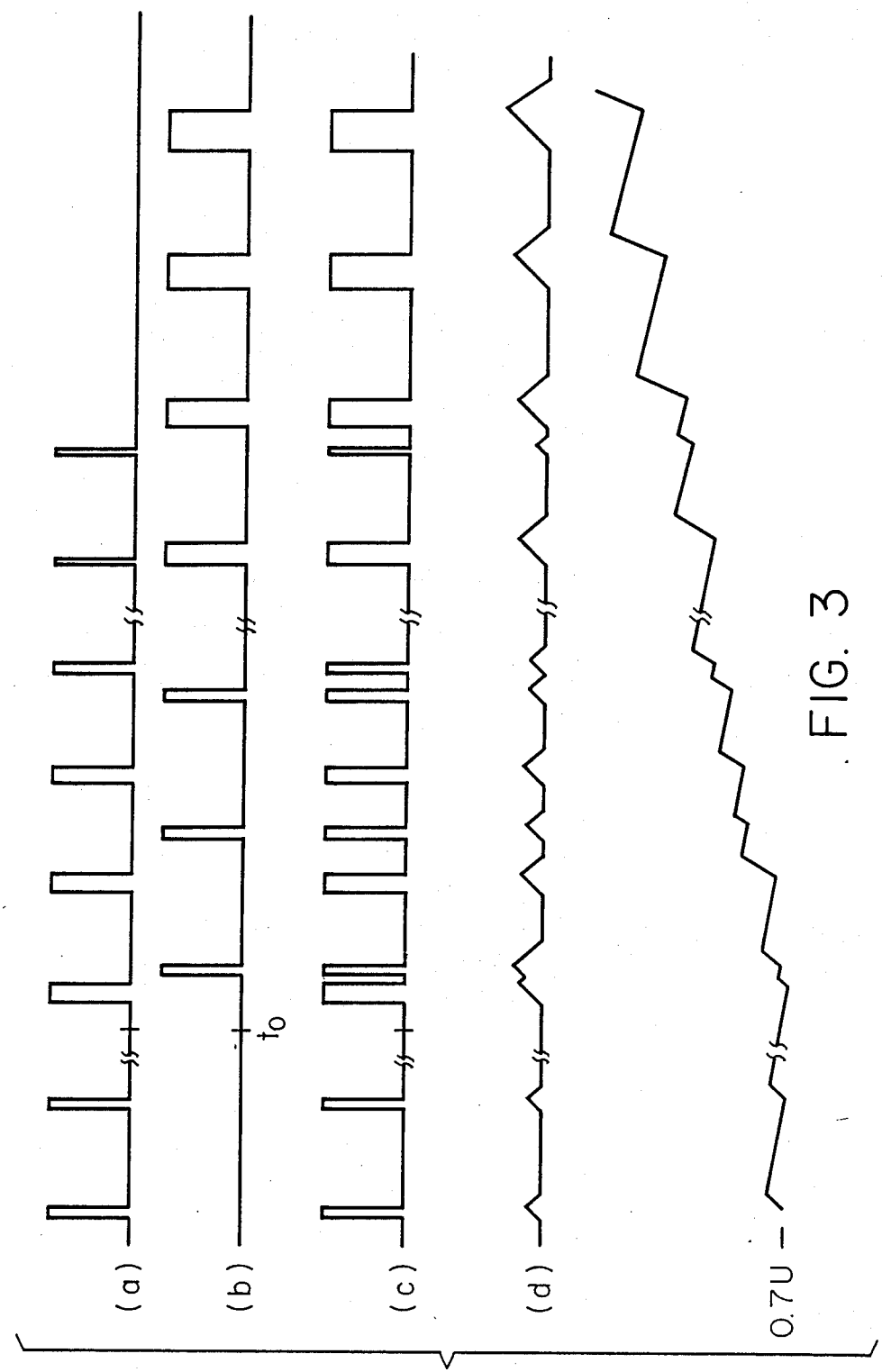

FIG. 1 illustrates the principle behind an external-power stage. A network alternating-current voltage $U_N$ is rectified by means of a rectifier 1 into an unregulated operating voltage $U_B$ that builds up at a charge capacitor 2. The operating voltage is forwarded by way of the inductance of a winding 3 in an external-power stage transformer 4 to an electronic switch 5, which periodically for example connects winding 3 to reference potential at line frequency. At the secondary end of external-power stage transformer 4 are several secondary windings, two of which are illustrated by way of example. One winding 6 generates an operating voltage $U_1$ at a capacitor 7 by way of a diode 8 and another winding 9 another operating voltage $U_2$ at a capacitor 10 by way of diode 11. Operating voltage $U_1$ supplies for example an infrared amplifier 12 that, in stand-by mode remote-control operation, receives an ON command and a microprocessor 13 that carries out the command by closing a switch 14. On both the primary and secondary ends of external-power stage transformer 4 are control circuits 15 and 16 that consist of a pulse generator, a pulse-width modulator, and a control stage. These control circuits supply constantly wider pulses when the receiver is turned on. The primary-end control circuit 15 is intended to generate a controlled voltage $U_3$, lower than secondary controlled voltage $U_2$, at a capacitor 18 by way of a secondary winding 23 and a diode 17. When the receiver is off, in stand-by mode that is, voltages of a sufficient dimension, 70% of the nominal for example, will be present. When the receiver is turned on, a secondary-end control circuit 16 assumes control at nominal voltage.

How the circuitry operates will now be specified with reference to the graph in FIG. 2.

When network alternating-current voltage $U_N$ is applied, operating voltage $U_B$ will build up at charge capacitor 2. Primary-end control circuit 15 begins to operate and generates pulses that activate electronic switch 5 and become constantly wider. As soon as controlled voltage $U_3$ is 70% of nominal, the circuit switches into pulse-package operation. This approach is necessary to ensure silent stand-by operation because otherwise the individual pulses would generate audible mixed frequencies as they arrive that would be radiated out by way of external-power stage transformer 4. Pulse-package operation is achieved by altering the intended level of primary-end control circuit 15 by means of a switching device until a desired voltage $U_{s1}$ is lowered a prescribed extent, which depends on the requisite time intervals for the pulse package, to a level $U_{s2}$ as soon as the actual voltage attains desired voltage $U_{s1}$. Once the slowly descending actual voltage $U_{ist}$ arrives at lower level $U_{s2}$, the desired voltage is switched back to the higher level $U_{s1}$. This procedure is illustrated in FIG. 2 and is controlled by a comparator circuit 19 that compares actual voltage $U_{ist}$ with the particular desired voltage $U_{soll}$ that has been established. Comparator circuit 19 switches the desired voltage over, which can occur for example by varying reference voltages prescribed by reference diodes 20 and 21. The process is repeated periodically as long as the receiver is in stand-by mode.

Pulse-package operation can also be achieved by switching over the actual voltage level while varying the voltage-division ratio of a voltage divider 24, 25, and 26. Once the actual voltage attains the desired voltage, a contact 27 is opened that increases the level supplied to comparator circuit 19.

If the device is switched now from stand-by mode to normal operation when a remote-control command received through infrared amplifier 12 and through microprocessor 13 closes switch 14, secondary-end control circuit 16 will come into operation and provide control pulses to electronic switch 5 by way of a network-separating coupling stage 22. This control circuit will now itself supply constantly wider pulses in addition to pulses supplied by primary-end control circuit 15. Secondary voltages $U_1$ through $U_3$ will accordingly be magnified. Primary-end control circuit 15 will now automatically narrow the pulse width to zero because its prescribed desired level has been exceeded. From now on only secondary-end control circuit 16 will assume control of electronic switch 5.

Secondary-end control circuit 16 will be deactivated when the receiver is turned off. Primary-end control circuit 15 will assume control of the electronic memory and maintain the resulting operating voltage at 70% of its normal level. The operation of the circuitry illustrated in FIG. 1 is also illustrated in FIG. 2 by means of the time during which the device is switched from stand-by mode to normal operation and control is assumed by the secondary end of the external-power stage. The receiver is operating in stand-by mode up to time $t_o$. The operating voltages U are at 70% of their nominal level. The receiver is now switched over to normal operation. Secondary-end control circuit 16 now supplies pulses b that increase in width and arrive along with pulses a that are generated at the primary end at the control electrode of electronic switch 5. The result is pulses c. The switching current of electronic switch 5 is represented at d. It will be evident that the width of pulses a decrease as that of pulses b increases. The operating current increases steadily until it attains 100% of its nominal level.

To prevent the device from turning on too suddenly, subsequent for example to the response of a security circuit followed by the device turning on again, in which situation the collector current in the electronic switch could increase excessively, the desired voltage can be designed to increase continuously. This measure makes it possible for any turning-on process at all to be deactivated on the primary end and for the operating voltages to increase slowly to their nominal level.

To prevent any impermissible activity on the part of the external-power stage transformer that might occur during interruption of the electronic switch from generating voltage peaks that would then destroy it, a circuit can be provided to prevent the electronic switch from turning on again during the existence of the voltage peaks. A circuit of this type could for example be a timing stage consisting of a capacitor or digital counter.

A measure of this type is illustrated in FIG. 1. The voltage peaks are supplied at the collector of electronic switch 5 to a monostable flip-flop 29 by way of a zener diode 28. Flip-flop 29 activates a switch 30 that temporarily interrupts the control pulses.

We claim:

1. An external-power stage comprising: a load; an electronic switch for coupling pulses to said load; a control circuit adapted to vary pulses controlling said electronic switch in accordance with said load; a primary end and a secondary end in said external-power stage; a control circuit in said primary end and in said secondary end, each said control circuit having a pulse-width modulator and a control stage; said control circuit in said primary end supplying pulse groups during a ready-to-operate state; said control circuit in said primary end having a desired voltage and an actual voltage, said desired voltage being switchable over so that once said actual voltage attains a desired level said desired voltage is switched over to a lower desired level and said pulses controlling said electronic switch being suppressed until said actual voltage attains said lower desired level, said desired voltage being thereafter switched back to the higher desired level and said electronic switch beginning to be activated again with constantly expanding pulses.

2. An external-power stage comprising: a load; an electronic switch for coupling pulses to said load; a control circuit adapted to vary pulses controlling said electronic switch in accordance with said load; a primary end and a secondary end in said external-power stage; a control circuit in said primary end and in said secondary end, each said control circuit having a pulse-width modulator and a control stage; said control circuit in said primary end supplying pulse groups during a ready-to-operate state; said control circuit in said primary end having an actual voltage switchable over so that one said actual voltage attains a desired level said actual voltage is switched over to a higher actual level and said pulses controlling said electronic switch are suppressed until said actual voltage attains said desired level, said actual voltage being thereafter switched back to the lower level and said electronic switch beginning to be activated again with constantly expanding pulses.

3. An external-power stage comprising: a load; an electronic switch for transmitting electrical pulses to said load; a drive circuit coupled to said electronic switch for applying drive pulses to said electronic switch; transformer means including a primary end and a secondary end; a first control circuit in the primary end of said transformer means; a second control circuit in the secondary end of said transformer means; said first control circuit including a pulse-width modulator and a control stage; said second control circuit including a pulse-width modulator and a control stage; said first control circuit providing pulses to said electronic switch of varying width and of sufficient magnitude to maintain said load in a standby mode; said second control circuit coming into operation when said load is in an operative state and providing pulses to said electronic switch and operating with said first control circuit for a predetermined period of time, said second control circuit thereafter taking over providing pulses to said electronic switch and said first control circuit being switched to an inoperative state, said control circuit in said primary end only being operative in said standby mode, said control circuit in said secondary end being operative during normal mode of operation.

4. An external-power stage as defined in claim 3, wherein said control circuit in said primary end and said control circuit in said secondary end have each an operating frequency differing form the other.

5. An external-power stage as defined in claim 3, wherein said control circuit in said primary end is in an on state and said control circuit in said secondary end is in an off state during standby operation.

6. An external-power stage as defined in claim 3, wherein said control circuit in said primary end supplied pulse groups during a standby operation.

7. An external-power stage as defined in claim 3, wherein said control circuit in said secondary end is in an operative state during normal operation, said control circuit in said primary end being in an inoperative state during normal operation.

8. An external-power stage as defined in claim 3, wherein said control circuit in said primary end determines an operating frequency during transition from standby operation to normal operation.

9. An external-power stage as defined in claim 6, wherein said control circuit in said primary end has a desired voltage that can be switched over.

10. An external-power stage as defined in claim 6, wherein said control circuit in said primary end has an actual voltage that can be switched over.

* * * * *